(12) United States Patent
Kanioz

(10) Patent No.: US 9,022,185 B2
(45) Date of Patent: May 5, 2015

(54) ELECTROMECHANICAL FRICTION SHOCK ABSORBER

(76) Inventor: Adil Kanioz, Kocaeli (TR)

( * ) Notice: Subject to any disclaimer, the term of this patent is extended or adjusted under 35 U.S.C. 154(b) by 291 days.

(21) Appl. No.: 13/697,216

(22) PCT Filed: May 11, 2010

(86) PCT No.: PCT/IB2010/052083
§ 371 (c)(1),
(2), (4) Date: Jan. 3, 2013

(87) PCT Pub. No.: WO2011/141770
PCT Pub. Date: Nov. 17, 2011

(65) Prior Publication Data
US 2013/0098718 A1    Apr. 25, 2013

(51) Int. Cl.
*F16F 7/09* (2006.01)
*D06F 37/20* (2006.01)
*F16F 7/08* (2006.01)

(52) U.S. Cl.
CPC ............... *F16F 7/095* (2013.01); *D06F 37/20* (2013.01); *F16F 7/082* (2013.01); *F16F 7/09* (2013.01)

(58) Field of Classification Search
CPC ............. F16F 7/082; F16F 7/09; F16F 7/095; D06F 37/20
USPC ................... 188/381, 271, 272, 129, 68, 186
See application file for complete search history.

(56) References Cited

U.S. PATENT DOCUMENTS

| | | | |
|---|---|---|---|
| 2,145,255 A * | 1/1939 | Granberg et al. | 82/134 |
| 4,889,211 A * | 12/1989 | Carlson | 188/68 |
| 4,901,829 A * | 2/1990 | East et al. | 188/381 |
| 6,247,564 B1 * | 6/2001 | Kim | 188/300 |
| 2006/0201757 A1 * | 9/2006 | Dupuis et al. | 188/72.3 |
| 2008/0256986 A1 * | 10/2008 | Ackermann et al. | 68/23.1 |

FOREIGN PATENT DOCUMENTS

EP           2090687 A1 *  8/2009  ............. D06F 37/22

* cited by examiner

*Primary Examiner* — Xuan Lan Nguyen
(74) *Attorney, Agent, or Firm* — Nath, Goldberg & Meyer; Jerald L. Meyer; Katelyn J. Bernier

(57) ABSTRACT

An electromechanical friction shock absorber is used in washing machines wherein the washing drum rotates on the horizontal axis and comprises at least one cylindrical shock absorber piston, at least one shock absorber body that surrounds the shock absorber piston, moving telescopically along the same work axis with the piston, and a bearing piston from its end part. At least one brake shoe is seated in the clearances provided on the shock absorber body via sliding surfaces. At least one friction element is located on the inner part of the brake shoe and the outer part of the shock absorber and includes surfaces along the work axis that do not contact the brake shoe. At least one lock ring bears the shock absorber piston on the shock absorber body and prevents the friction element from getting displaced out of the body, with the inventive electromechanical friction shock absorber.

16 Claims, 6 Drawing Sheets

Figure 3
Figure 4
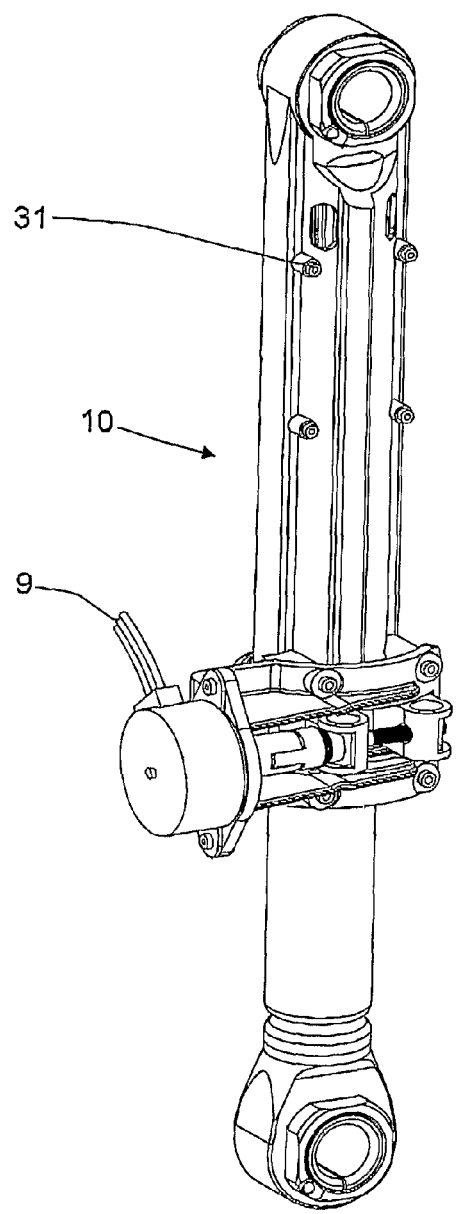
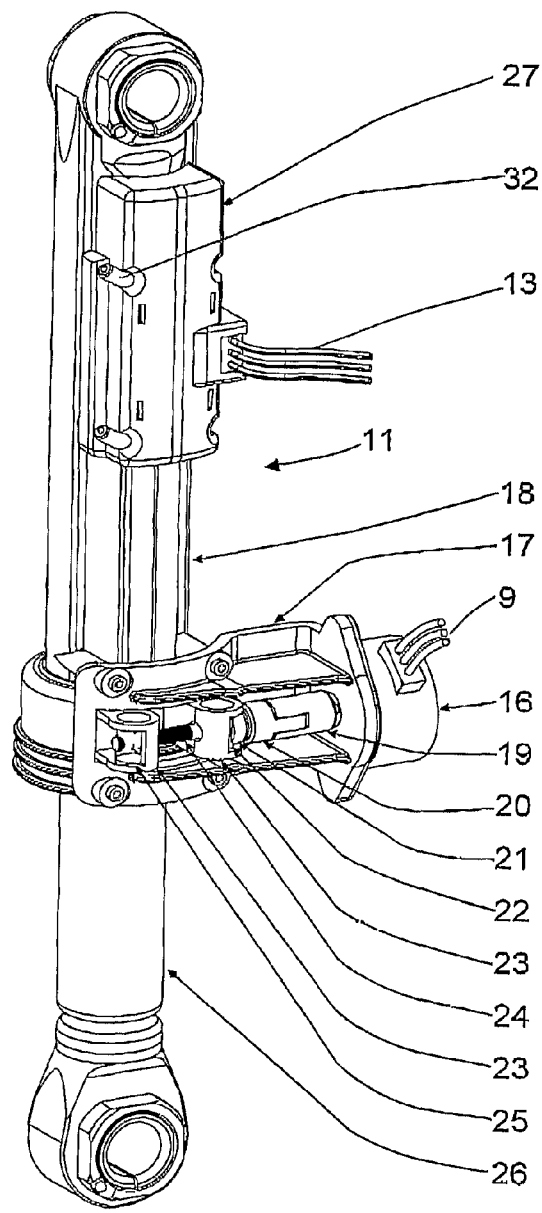

ELECTROMECHANICAL FRICTION SHOCK ABSORBER

This is a National Phase Application filed under 35 U.S.C. 371 as a national stage of PCT/IB2010/052083, filed May 11, 2010, the content of which is hereby incorporated by reference in its entirety.

FIELD OF THE INVENTION

This invention relates to an electromechanical friction shock absorber which is used in washing machines wherein the washing drum rotates on the horizontal axis.

PRIOR ART

Shock absorbers provided in washing machines are generally of two types. In the first type, the damping force is always constant while there occurs some decrease in the power only when it warms up, and causes extra vibration in the small drum movements where low damping is required. In the second type, the damping force can be reduced to zero in the small drum movements. Thus, both the shock absorber becomes long-lasting and the vibration level of the machine can be reduced. However neither of the two types of shock absorbers can provide an effective damping in the occurrence of unbalanced loads which are different at every washing in the washing machine. This is because the damping forces are predetermined and fixed; and furthermore they do not receive a feedback regarding We movement of the dynamic system.

In the European patent document numbered EP2090687A1, known in the art, a metal tongs-shaped bracket is used which clamps the motor, gear system and the friction element. It is not possible for this system to work in practice. No system is thought of for eliminating the tensioning. Moreover, it is not possible for the speed of a system with a gear system to reach the speed of the dynamic system of the washing machine drum.

A damping force is tried to be produced by the magnetic effect described in the patent document numbered WO2006037767A1; however in this system, energy should be supplied to the coils continuously to reset or produce the force. This increases electricity consumption of the washing machine. Furthermore, it is not possible to produce the desired force range in this system. Only the maximum damping force and zero damping force are available. On the other hand, friction force can not be produced by pressing with the spring in a direction perpendicular to the pressing axis, and even if it is produced, since the coil force can not overcome the spring force the system cannot attain its objective.

In the systems disclosed in the above mentioned patent applications, dynamics of the washing drum could not be completely damped duly. Furthermore they have not been applied industrially. Their performances are low and production costs are high.

SUMMARY OF THE INVENTION

The objective of the present invention is to provide an electromechanical friction shock absorber which controls the dynamics of the washing machine drum in real and full time according to the amount of laundry, the resulting unbalanced load, spin speed of the drum, and as a result of all these parameters, the amount of movement of the drum.

Another objective of the invention is to provide an electromechanical shock absorber which, by the help of a stroke sensor that may be incorporated to the system, detects the amount of laundry placed into the drum and thus decides on the amount of water and detergent to be used, and which calculates the required force more precisely by measuring the drum movement at any time.

The shock absorber developed for that purpose comprises two brake shoes which contact the friction element only from the outside thereof; two friction elements whose two sides are completely open in the shock absorber work axis; two slots provided in the inner surface of the body for restricting and bearing the movement of the brake shoes within the shock absorber body; a support axis at the corner of each of these slots; a brake screw for clamping and unclamping the brake shoes around the said support axes, which brake screw is connected to the shock absorber body via a bracket and rotated via a step motor; a coupling connection system for preventing tensioning from occurring in the said brake screw during its movement; and threaded and unthreaded brake support. Preferably a stroke sensor can also be incorporated to the system for making the control more precise.

Since a damping force is not generated by the shock absorbers before the machine starts to operate, the washing machine drum allows to measure the amount of laundry loaded therein and thus to interfere with the amount of detergent and water to be used. When the drum is rotating at a high and constant speed, it produces some oscillation. It is sufficient for the shock absorber piston to freely move in the space formed within the machine. The drum vibration of the washing machine is only absorbed by the springs of the washing machine and the vibration is prevented from being transmitted to the feet of the machine contacting the floor. If the drum movement reaches a level that will result with vibration, the required damping force is instantly generated by the shock absorber depending on the amount of laundry in the drum and the oscillation speed of the drum, whereby occurrence of vibration in the washing machine is prevented.

Since the tensioning occurring between the step motor and the brake shoes used in the inventive electromechanical friction shock absorber due to dislocation of the shoes relative to the work axis, is completely prevented by the coupling system comprising a female coupling, a male coupling and a coupling washer; torque and power of the step motor is maintained at a low level. As a result of this the production costs are ensured to be low. Therefore, it is economical at an industrially applicable level as opposed to the prior systems.

DETAILED DESCRIPTION OF THE INVENTION

The "Electromechanical friction shock absorber" realized in order to attain the objectives of the invention is illustrated in the accompanying figures, wherein;

FIG. 3 is the perspective view of the electromechanical friction shock absorber without a stroke sensor.

FIG. 4 is the perspective view of the electromechanical friction shock absorber with a stroke sensor.

Figure 1:
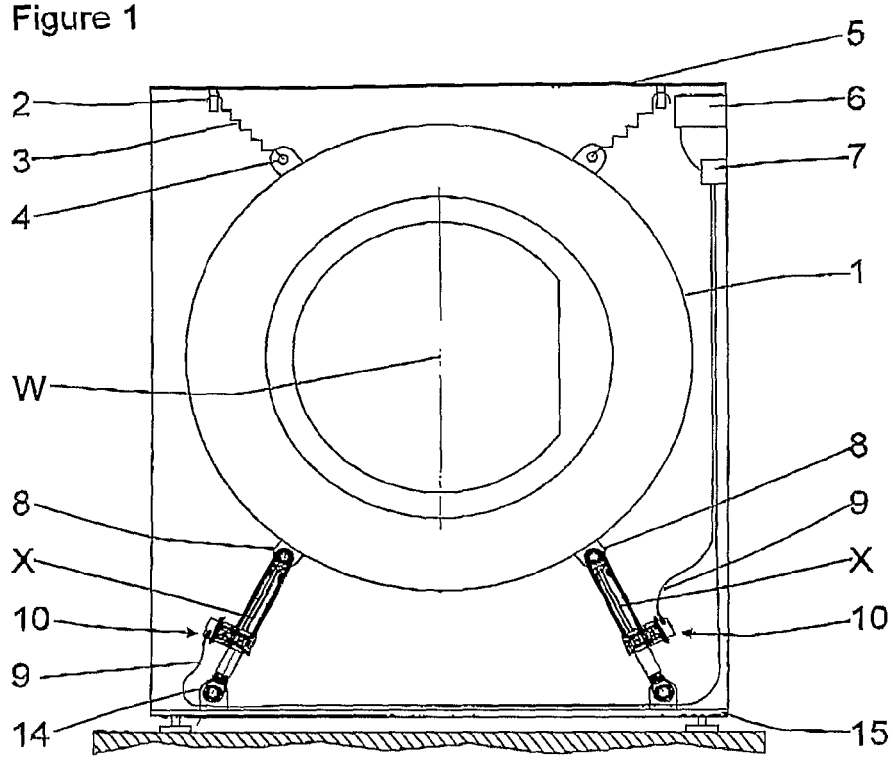
FIG. 1 is the view of the application of the inventive electromechanical friction shock absorber without a stroke sensor on the washing machine having a drum rotating on the horizontal axis.

The components in the figures have each been numbered corresponding to the following:

1. Drum
2. Spring suspension ring
3. Spring
4. Drum spring suspension ring
5. Washing machine body
6. Main control board
7. Shock absorber control board
8. Drum bracket
9. Control board connection cable
10. Electromechanical friction shock absorber
11. Electromechanical friction shock absorber with stroke sensor
12. Stroke sensor
13. Stroke sensor connection cable
14. Base bracket
15. Washing machine base
16. Step motor
17. Step motor bracket
18. Shock absorber body
19. Female coupling
20. Male coupling
21. Coupling washer
22. Brake support
23. Brake shoe
24. Brake screw
25. Threaded brake support
26. Shock absorber piston
27. Stroke sensor holder
28. Stroke sensor magnet holder
29. Stroke sensor magnet
30. Friction element
31. Stroke sensor retainer pins
32. Stroke sensor retainer pin mounting hole
33. Step motor bracket retainer pins
34. Brake shoe support side bearing clearance
35. Brake shoe screw side bearing clearance
36. Lock ring
37. Friction element retainer level
38. Friction element retainer lug
39. Brake shoe lower side sliding surface
40. Brake shoe upper side sliding surface
41. Brake shoe sliding surface
42. Brake shoe abutment surface
43. Brake shoe support bearing
44. Brake shoe movement contact surface
45. Bracket retainer pin mounting hole
46. Step motor retainer pin
47. Bracket mounting contact surface
48. Step motor flange mounting bearing
49. Step motor bracket rib
50. Step motor bracket brake shoe hole
51. Step motor bracket
52. Step motor connecting flange
53. Brake support hole
54. Brake support bearing surface
55. Threaded brake support thread
56. Threaded brake support bearing surface
57. Brake screw serration
58. Brake screw threaded part
59. Male coupling brake screw mounting hole
60. Female coupling step motor shaft mounting hole
61. Coupling washer bearing surface
62. Coupling washer brake screw hole
63. Female coupling bearing surfaces
64. Male coupling bearing surfaces
65. Friction element bearing surface
66. Friction element bearing surface
67. Shock absorber piston bearing surface X: Shock absorber work axis
Z: Support axis
S: Brake screw work axis
M: Step motor work axis The shock absorber is composed of two parts, namely the body and the piston. In the electromechanical friction shock absorber (10, 11), in addition to providing bearing to the shock absorber piston (26) along the work axis (X) and providing connection to the washing machine bracket (8), the shock absorber body (18) also accommodates the structure required to attain the objective of the invention.

The inventive electromechanical friction shock absorber (10, 11) is preferably used in front loading washing machines. The washing machine, on which the electromechanical friction shock absorber (10, 11) is applied, comprises a drum (1) rotating on the horizontal axis (W). The drum (1) is connected to the washing machine body (5) by means of the springs (3) disposed between the drum spring suspension ring (4) and the washing machine spring suspension ring (2) located on the body (5). On the other hand, the drum (1) is coupled to the washing machine base (15) along the work axis (X) by means of at least two shock absorbers (10.11) mounted between the drum bracket (8) and the base bracket (14). Electromechanical friction shock absorbers (10, 11) can be adapted to washing machine in two versions.

Figure 2:
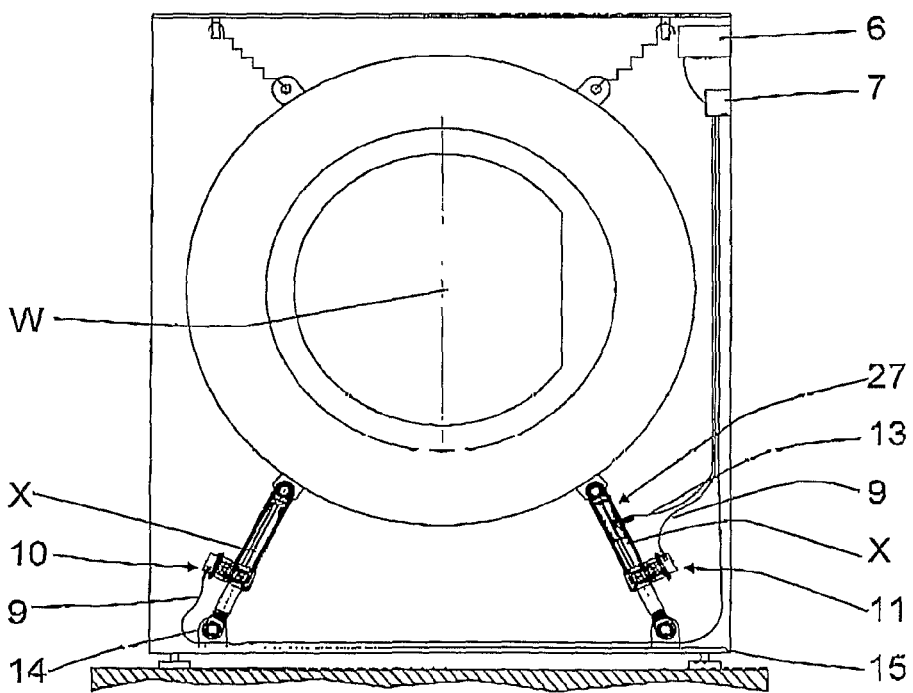
FIG. 2 is the view of the application of the inventive electromechanical friction shock absorber with a stroke sensor on the washing machine having a drum rotating on the horizontal axis.
Figure 5:
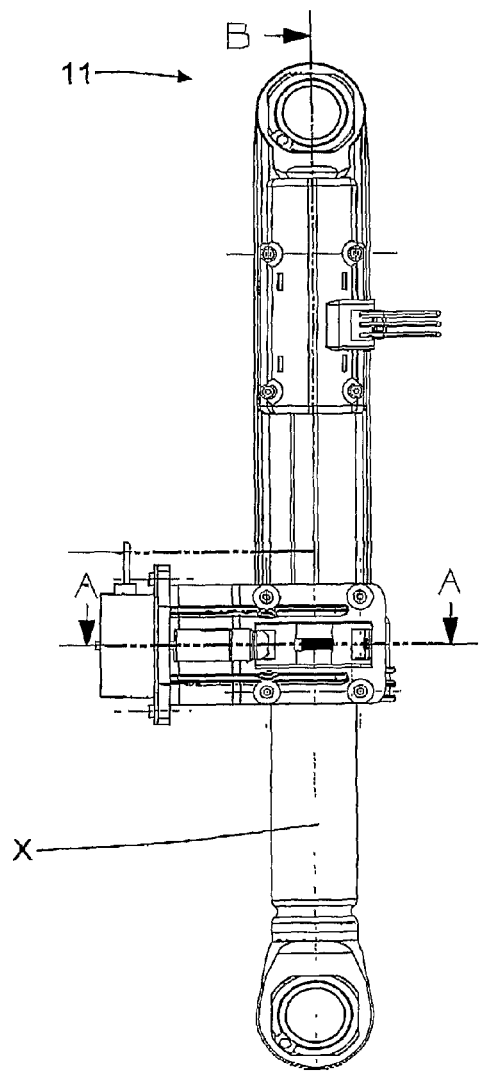
FIG. 5 is the axial view of the electromechanical friction shock absorber.
Figure 6:
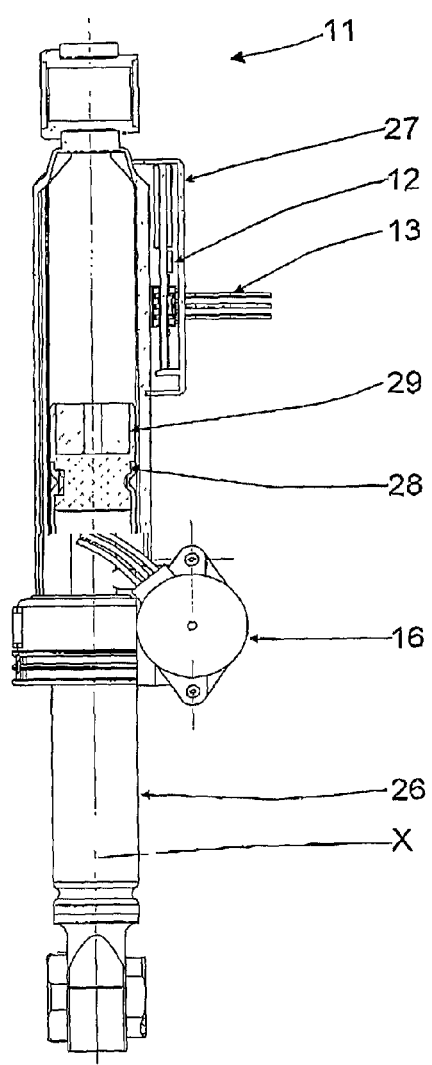
FIG. 6 is the axial sectional view of the electromechanical friction shock absorber.

In the first version, only a sufficient number of electromechanical friction shock absorbers (10) are adapted to the washing machine (FIG. 1). In the second version, in addition to the sufficient number of electromechanical friction shock absorbers (10), one electromechanical friction shock absorber (11) with stroke sensor is used (FIG. 2). This stroke sensor (12) is preferably magneto-resistive. The stroke sensor (12) operates with the principle of detecting the position of a magnet (29), connected to the shock absorber piston (26) via a holder (28), within the shock absorber body (18). The stroke sensor (12) is mounted by fixing the stroke sensor retainer mounting pins (31) provided on the shock absorber body (18) to the retainer pin mounting holes (32) provided on the stroke sensor holder (27) by means of hot-driven rivet method.

The washing machine sound and vibration values are improved upon the electromechanical friction shock absorber (11) receiving feedback related to the drum (1) movement by means of the said stroke sensor (12). Additionally, the stroke sensor (12) allows measurement of the amount of laundry placed into the washing machine in terms of weight. With this measurement information, the amounts of water and detergent to be used are controlled, whereby energy is saved and the environment is prevented from being polluted by unnecessary amounts of detergent.

The electromechanical friction shock absorbers (10, 11) communicate with the electromechanical friction shock absorber control board (7) via the control board connection cable (9). The washing machine main control board (6) also preferably communicates with the electromechanical friction shock absorber control board (7). The stroke sensor (12) is connected to the control board (7) via the stroke sensor connection cable (13).

The electromechanical friction shock absorber (10) basically comprises ;
- at least one cylindrical shock absorber piston (26),
- at least one shock absorber body (18) that surrounds the shock absorber piston (26), moves telescopically with the piston (26) along the shock absorber work axis (X), and bears the piston (26) from its end part,
- one or more brake shoes (23) which are located around the shock absorber piston (26) upon being seated into the bearing clearances (34, 35) within the shock absorber body (18), and which move around the support axis (Z),
- at least one lock ring (36) which bears the shock absorber piston (26) on the shock absorber body (18) and prevents the friction element (30) from getting displaced out of the shock absorber body (18),
- one or more friction elements (30) which are positioned between the brake shoes (23) and the shock absorber piston (26), and which are tightly fixed in advance along the work axis (X) by the shock absorber body (18) and the lock ring (36).

By means of the bracket (17) that is mounted to the shock absorber body (18), a motor can be coupled to the shock absorber (10, 11) and the brake shoes are actuated.

Upon coupling a step motor bracket (17), the electromechanical friction shock absorber (10, 11) further comprises
- at least one brake screw (24) which rotates the brake shoes (23) along the work axis (S) to pull and push them towards/away from each other around the support axis (Z),
- at least one brake support (22) which is seated on the brake shoe (23) and through which the brake screw (24) passes,
- at least one threaded brake support (25) seated on the brake shoes (23) along the work axis (X) and driven by the brake support (22) and the brake screw (24) for transferring the movement of the brake screw (24) to the brake shoes (23),
- at least one step motor (16) positioned on the shock absorber body (18) in the motor axis (M) via a bracket (17) for rotating the brake screw (24) in the motor axis (M),
- at least one female coupling (19) and at least one male coupling (20) used for preventing the tensioning resulting from deviation of the brake screw work axis (S) from the motor axis (M) as a result of the brake screw (24) rotating around the support axis (Z) of the brake shoe (26), and
- a coupling washer (21) which prevents tensioning between the brake support (22) and the female coupling (19).

The brake shoes (23) are seated to the support side bearing clearance (34) located on the shock absorber body (18) and to the screw side bearing clearance (35) which is wider than the support side bearing clearance (34). The brakes shoes (23) are arranged into the clearances (34, 35) in a slightly tight manner such that they will comfortably slide between the brake shoe sliding surfaces (41), shock absorber body upper sliding surfaces (40) and lower sliding surfaces (39), but will not create a gap. On both sides of the support side bearing clearance (34), there is support axis (Z) in the direction of the work axis (X).

These axes (X, Z) form the basis of the system. The pressure force (Fs) which forms the friction force produced during operation of the system, and the motor force (Fm), form the crank principle around the support axis (Z). When the shock absorber (10) damping force of the two brake shoes (23) is zero, the abutment surfaces (42) are parallel to and contact each other. When the damping force is being produced, the movement contact surface (44) comes to a linear contact position.

The friction elements (30) are arranged at the inner part of the brake shoes (23) and at the outer part of the shock absorber piston (26) on the central work axis (X). In order to limit movement of the friction elements (30) around the work axis (X), the brake shoe (23) preferably comprises two retainer levels (37) and retainer lugs (38) for preventing the friction elements (30) from rotating between the brake shoe (23) and the shock absorber piston (26) around the work axis (X) during operation. The retainer lugs (38) arc preferably 0.5× 45°.

The friction elements (30) are fixed along the work axis (X) by the bearing surface (65) located on the shock absorber body (18) and the bearing surface (66) located on the lock ring (36). The friction elements (30) are longer than the clearance (34, 35), into which they are positioned, both from the top and the bottom along the work axis (X). Preferably this distance is 2 mm. This way, the pressure made by the brake shoe sliding surfaces (41) to the shock absorber body (18) upper sliding surfaces (40) and the lower sliding surface (39) along the work axis (X) is substantially reduced and the risk of noise is eliminated.

The lock ring (36), with the flexible piston bearing surface (67) enables the shock absorber piston (26) to be initially fixed at the entrance of the shock absorber body (18) along the work axis (X) and allows its vertical movements to be prevented.

The step motor bracket (17) is mounted to the shock absorber body (18) by fixing the step motor bracket retainer pins (33) to the retainer pin mounting hole (45) provided on the step motor bracket (17) by way of hot driven rivet technique.

The step motor bracket (17) is preferably made of plastic. The bracket (17) is reinforced by bracket ribs (49) in order to enhance its resistance properties. On the bracket (17) there are provided a brake shoe hole (50) to enable movement of the brake shoes (23) and retainer pins (46) to which the step motor (16) is connected. There arc additionally mounting holes (45) provided on the bracket (17) used for connection of the bracket to the shock absorber body (26).

Thanks to the symmetrical structure of the bracket (17), the step motor (16) can be taken to both sides of the shock absorber (10, 11). In other words, the bracket can be mounted to the shock absorber body (18) upon being rotated 180°.

The step motor flange (52) is centered to the bracket (17) via the flange mounting hearing (48), The step motor bracket (51) and the step motor bracket (17) contact each other via the mounting contact surface (47). Additionally, the step motor bracket (51) holes are fitted over the step motor retainer pins (46) provided on the bracket (17) and connection is realized by applying hot driven rivet technique.

The female coupling (19) is tightly connected to the serrated shaft of the step motor (16) via the mounting hole (60). Thus the step motor (16) and the female coupling (19) are positioned on a motor work axis (M) and the motor axis (M) is positioned at a fixed distance to the shock absorber (10) work axis (X). This distance remains constant during operation.

There are support bearings (43) at the end part of the brake shoe (23). There are two different types of supports on the two identical brake shoes (23) located on the shock absorber (10), namely brake support (22) and threaded brake support (25).

The brake support (22) is located on the brake shoe (23) that is closer to the step motor (16). The brake support (22) fits to the brake support bearing (43) via the bearing surface (54) in a slightly tight manner. Function of the brake support (22) is to allow the brake screw (24) to pass through it via a larger support hole (53), while at the same time providing support to the coupling washer (21) by means of the bearing surface (61). The coupling washer (21) is positioned between the male coupling (20) and the brake support (22). In the meantime, the brake screw (24) passes through the hole (62) in the center of the coupling washer (21). The coupling washer (21) can rotate in a slightly tight manner between the male coupling (20) and the brake support (22).

The threaded brake support (25) is located on the brake shoe (23) that is distant from the step motor (16). The threaded brake support (25) fits to the brake shoe (23) brake support bearing (43) via the bearing surface (56) in a slightly tight manner. Its main function is to transmit the movement of the brake screw (24) to the brake shoe (23) via the thread (55) provided along the work axis (S), and, to prevent the brake screw (24) work axis (S) from making an angle to the motor work axis (M), while enabling it to turn around the support axis (Z). The thread (55) is preferably of M3 size.

The brake screw (24) is tightly connected to the brake screw mounting hole (59) provided on the male coupling (20) via the brake screw serration (57). The end part of the brake screw (24) is threaded (58) in order to transmit movement to the threaded brake support (25). The thread (58) is preferably of M3 size.

The female coupling (19) bearing surfaces (63) and the male coupling (20) bearing surfaces (64) bear each other in a slightly tight manner. This way, occurrence of tensioning during operation of the brake shoes (23) is prevented and the torque values of the step motor (16) are very low.

Figure 7:
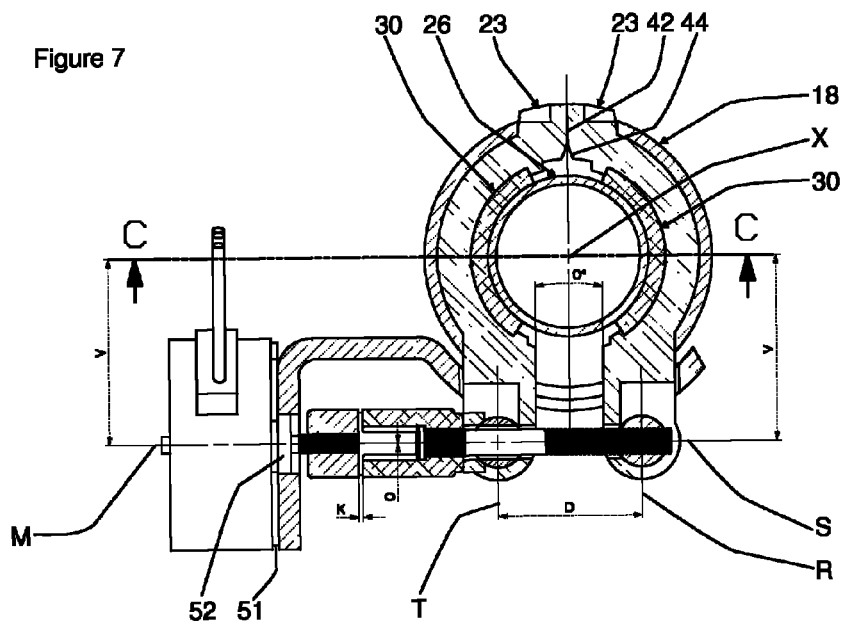
FIG. 7 is the sectional view of the electromechanical friction shock absorber perpendicular to the work axis when the damping force is zero.
Figure 8:
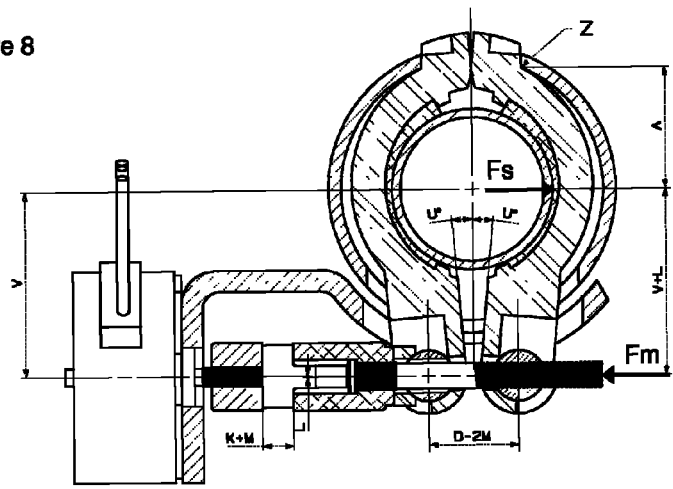
FIG. 8 is the sectional view of the electromechanical friction shock absorber perpendicular to the work axis when the damping force is maximum.
Figure 9:
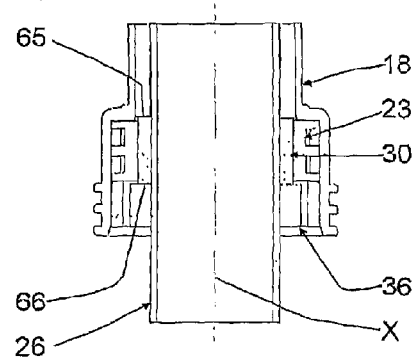
FIG. 9 is the axial sectional view of the shoe-friction element bearing system provided in the electromechanical friction shock absorber.
Figure 10:
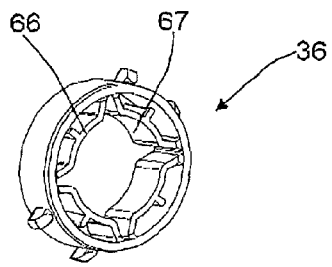
FIG. 10 is the perspective view of the lock ring in the electromechanical friction shock absorber.
Figure 11:
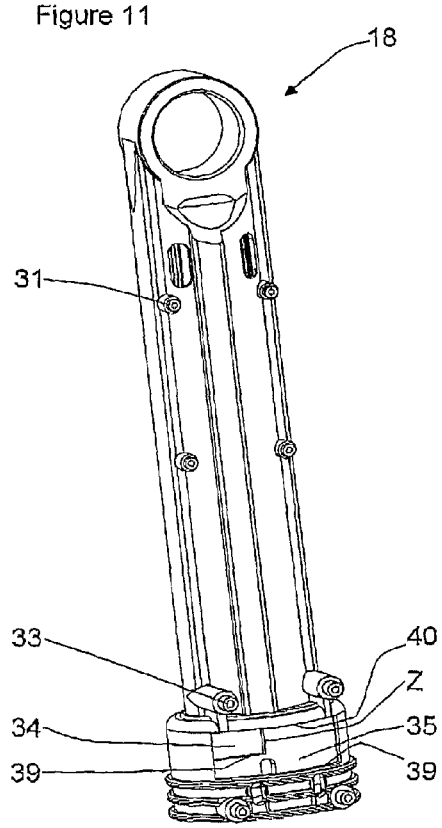
FIG. 11 is the perspective view of the shock absorber body in the electromechanical friction shock absorber.
Figure 12:
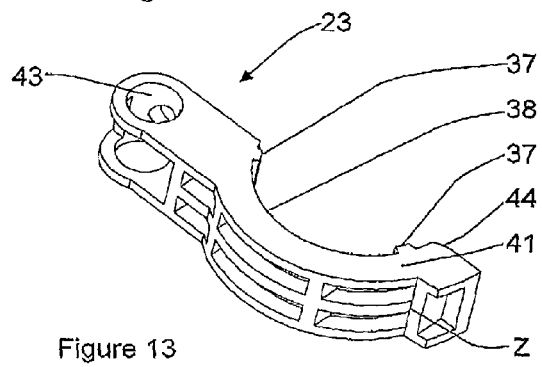
FIG. 12 is the perspective view of the brake shoe in the electromechanical friction shock absorber.
Figure 13:
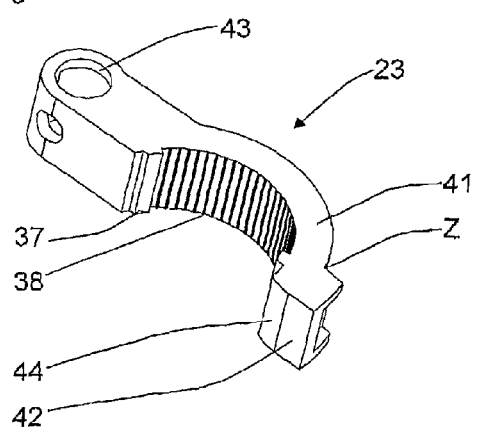
FIG. 13 is the perspective view of the brake shoe in the electromechanical friction shock absorber.
Figure 14:
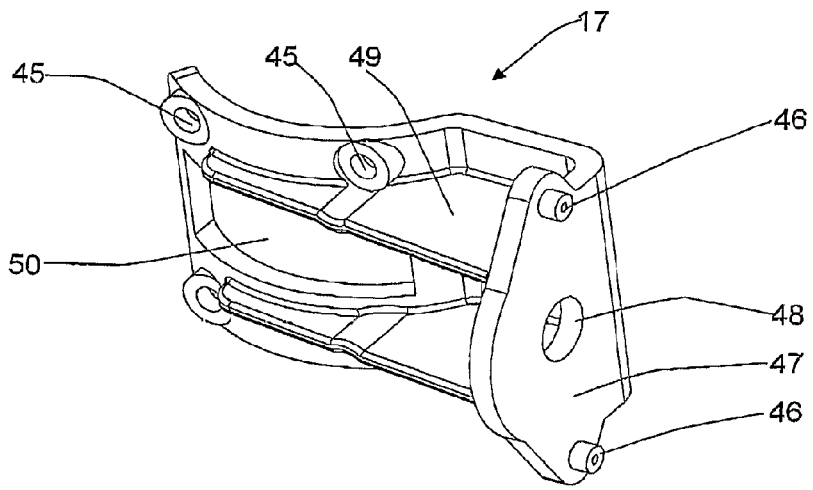
FIG. 14 is the perspective view of the motor bracket in the electromechanical friction shock absorber.
Figure 15:
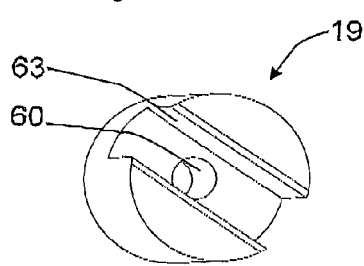
FIG. 15 is the perspective view of the female washer in the electromechanical friction shock absorber.
Figure 16:
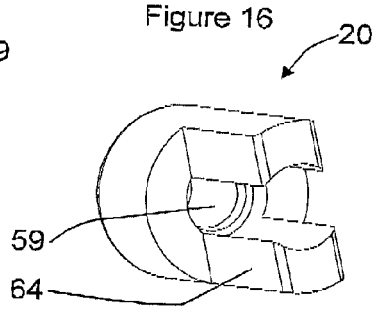
FIG. 16 is the perspective view of the male washer in the electromechanical friction shock absorber.
Figure 17:
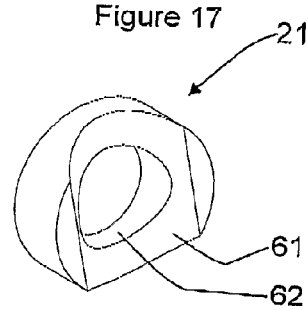
FIG. 17 is the perspective view of the coupling washer in the electromechanical friction shock absorber.
Figure 18:
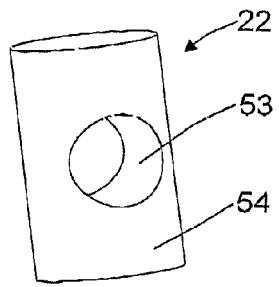
FIG. 18 is the perspective view of the brake support in the electromechanical friction shock absorber.
Figure 19:
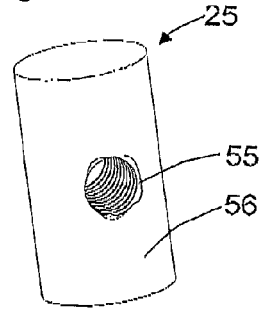
FIG. 19 is the perspective view of the threaded brake support in the electromechanical friction shock absorber.
Figure 20:
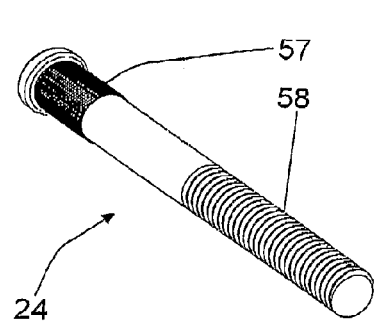
FIG. 20 is the perspective view of the brake screw in the electromechanical friction shock absorber.

Positions or the brake shoes (23) on the shock absorber piston (26) during operation of the shock absorber (10, 11) are called as fall open (FIG. 7) and full closed (FIG. 8); but positions of the shoes (23) should not be limited to two positions, namely full open and full closed.

The brake shoe (23) comes to a full open and lull closed position preferably in a total of 10 rotations by means of the movement coming from the step motor (16) to the threaded shaft (24). When the damping force originating from the force applied on the brake shoe (23) friction element (30) in full open position is zero; it may come to full closed position in 10 rotations reaching the maximum damping force.

If an intermediate damping value is desired with the brake shoe (23), the required damping force is reached by making it rotate by required number of tours. Transition among the lull open position and full closed position takes less than 1 second with the step motor (16) preferably having a speed of 1000 rpm used in the inventive shock absorber (10, 11).

When its full open position is closely examined
The damping force is zero Newton. The friction element (30) does not apply force to the shock absorber piston (26). The brake shoes (23) are parallel to the sectional axis. The brakes shoes (23) are in contact with each other via the brake shoe abutment surface (42) at parallel surfaces. The motor axis (M) coincides with the brake screw work axis (S). In this case, the axes (M, S) are placed at an equal distance (V) to the work axis (X). The brake shoes (23) support axes (T, R) are spaced from each other by a D distance. The distance between the female coupling (19) and the male coupling (20) is K.

When its full closed position is closely examined The damping force is maximum. The friction element (30) applies maximum force to the shock absorber piston (26). The brake shoes (23) make an angle of U around the support axis (Z), relative to the work axis (X). This angle is preferably 7°. The brakes shoes (23) at this point are in linear contact with the brake shoe movement contact surfaces (44). Thus, the brake shoes (23) are prevented from tensioning within the bearing clearance (34). There occurs distance L between the motor axis (M) and the brake screw (24) work axis (S). Thanks to use of couplings, the brake shoes (23) are prevented from tensioning. The tensioning produced by distance L is eliminated between the male coupling (20) and the female coupling (19). While the motor axis (M) maintains the distance V with the work axis (X), the brake screw work axis (X) is now at a distance V+L to the work axis (X). The brake shoes support. axes (T, R) are spaced from each other by a D-2M distance. The distance between the female coupling (19) and the male coupling (20) is now K+M.

If the operation of the brake shoe driven by the step motor (16) on the friction element (30) is to be formulated;

upon taking momentum according to the support axis (Z) in the same direction with the work axis (X), the formula is as follows:

$$M(Z) = -((Fs) \times (A)) + ((Fm) \times (A+V+L)) = 0$$

Here, Fs denotes the pressure force between the piston (26) and the friction element (30). The friction force of the electromechanical friction shock absorber (10) is a function of the pressure force (Fs); and as the pressure force (Fs) increases so does the friction force.

Fm is the pulling force transmitted to the brake shoe (23) via brake screw (24) with the torque produced by the step motor (16). What is symbolized here (Fm) is the total force of pulling both of the brake shoes (23).

The important issue here is that the distance of (Fm) force to the support axis (Z) (A+V+L) is much more distant from the distance (A) of (Fs) force to the support axis (Z) (A<(A+V+L)). Therefore, the low torque step motor (16) reaches high friction force values by the crank effect created without using a gear group.

Furthermore, even when the inventive electromechanical friction shock absorber (10, 11) reaches the full closed position, that is to say, when the power reaches the maximum level, electricity consumption in the system is zero. By means of the brake screw (24) system, friction force is maintained without use of any power until the step motor (16) is rotated. Energy is consumed only when the brake shoe (23) is applying friction force to the friction element (30) by the movement of the brake screw (24).

Within the scope of this basic concept, it is possible to develop various embodiments of the inventive electromechanical friction shock absorber (1). The invention can not be limited to the examples described herein and it is essentially according to the claims.

The invention claimed is:

1. Electromechanical friction shock absorber (10, 11) comprising a cylindrical shock absorber piston (26); a shock absorber body (18) that surrounds the shock absorber piston (26), moves telescopically along the same work axis (X) with the piston (26), and bears the piston (26) from its end part;
   at least two brake shoes (23) which are located in between the shock absorber body (18) and the piston (26) and which move telescopically during operation on the same work axis (X) with the body (18),
   at least one friction element (30) which is located in between the brake shoes (23) and the outer surface of the shock absorber piston (26) ; and
   at least one lock ring (36) which bears the shock absorber piston (26) on the shock absorber body (18) and prevents the friction element (30) from getting displaced out of the body (18),
   a step motor (16) for rotating a brake screw (24),
   wherein the first brake shoe (23) has a support bearing (43) suitable for accommodating a brake support (22),
   wherein the second brake shoe (23) has a support bearing (43) suitable for accommodating a threaded brake support (25),
   wherein said brake screw (24) is located such that it passes through a hole (53) of said brake support (22) at its proximal end and through the threaded hole (55) of said threaded brake support (25) at its distal end,
   characterized in that the absorber further comprises a coupling system (19, 20, 21) for coupling the brake screw (24) with the step motor (16), said coupling system comprising a female coupling (19), a male coupling (20) and a coupling washer (21), said coupling washer (21) being disposed rotatably between said male coupling (20) and the brake support (22) for eliminating tensioning occurring in result of an axial change of a step motor axis (M) and a brake screw axis (S) when said brake screw (24) is rotated.

2. Electromechanical friction shock absorber (10, 11) according to claim 1, characterized by a flexible piston bearing surface (67) which prevents movement of the shock absorber piston (26) perpendicular to the work axis (X) within the shock absorber body (18).

3. Electromechanical friction shock absorber (10, 11) according to claim 1, characterized by said friction element (30) which is fixed along the work axis (X) between a shock absorber body (18) bearing surface (65) and a lock ring (36) bearing surface (66).

4. Electromechanical friction shock absorber (10, 11) according to claim 1, characterized by retainer lugs (38) along the work axis (X) which prevent the friction elements (30) located at the inner part of the brake shoes (23) from sliding around the work axis (X).

5. Electromechanical friction shock absorber (10, 11) according to claim 1, characterized by a brake shoe abutment surface (42) and brake shoe movement contact surface (44) which enable the brake shoes (23) to constantly contact each other during movement.

6. Electromechanical friction shock absorber (10, 11) according to claim 1 characterized by the male coupling (20) which fixes the brake screw (24) via a mounting hole (59) it possesses.

7. Electromechanical friction shock absorber (10, 11) according to claim 6 characterized by the coupling washer (21) which is positioned between the male coupling (20) and the brake support (22); is able to rotate upon contact of a brake support bearing surface (54) with a bearing surface (61); and comprises a hole (62) for the brake screw (24) to pass through.

8. Electromechanical friction shock absorber (10, 11) according to claim 1, characterized by a step motor bracket (17); which provides connection between the step motor (16) and the shock absorber body (18); and comprises a hole (50) that allows passage of brake shoes (23), ribs (49) for resistance, and a step motor (16) flange mounting bearing (48).

9. Electromechanical friction shock absorber (10, 11) according to claim 8, characterized by retainer pins (33) which are provided on the shock absorber body (18) and which are connected to a mounting hole (45) on the step motor bracket (17) via hot driven rivet method.

10. Electromechanical friction shock absorber (10, 11) according to claim 1, characterized by the brake shoes (23) which linearly contact the work axis (X) at a constant distance (A) and a step motor (16) which uses a crank system around a support axis (Z) formed by the brake support located at the shock absorber body (18).

11. Electromechanical friction shock absorber (10, 11) according to claim 1 characterized by the brake screw work axis (S) which is at an equal distance (V) with the step motor axis (M) relative to the work axis (X) at zero damping force and at a distance of (V+L) relative to the step motor work axis (M) at maximum damping force.

12. Electromechanical friction shock absorber (10, 11) according to claim 1 characterized in that a space between the couplings (19, 20) is K at zero damping force and K+M at maximum damping force.

13. Electromechanical friction shock absorber (10, 11) according to claim 1, wherein the step motor axis (M) and the brake screw axis (S) overlap at zero damping force upon use of supports (22, 25) and the coupling system (19, 20, 21) at the brake screw (24) which enables connection of the brake shoes (23) to the step motor (16);
   wherein the screw deviates about a distance L relative to the work axis (X) at the maximum damping force; and characterized by a coupling system (19, 20, 21) which eliminates the tensioning occurring as a result of this axial change.

14. Electromechanical friction shock absorber (10, 11) according to claim 1 characterized in that it comprises a stroke sensor (12).

15. Electromechanical friction shock absorber (10, 11) according to claim 1 characterized by a magnet (29) mounted to the end part of the shock absorber piston (26) via a magnet holder (28).

16. Electromechanical friction shock absorber (10, 11) according to claim 15, characterized by a magneto-resistive sensor (12) which is connected via hot driven rivet method by means of a mounting hold (32) provided on a stroke sensor holder (27) and pins (31) provided on the shock absorber body (18).

* * * * *